United States Patent

[11] 3,604,276

| [72] | Inventors | Charles Eliot Hurlburt<br>River Edge;<br>Frederic O'Neil, Parsippany, both of, N.J. |
|---|---|---|
| [21] | Appl. No. | 834,721 |
| [22] | Filed | June 19, 1969 |
| [45] | Patented | Sept. 14, 1971 |
| [73] | Assignee | The Bendix Corporation |

[54] PULSE TORQUER FOR VERTICAL GYRO
9 Claims, 1 Drawing Fig.

| [52] | U.S. Cl. | 74/5.47, 74/5.8 |
|---|---|---|
| [51] | Int. Cl. | G01c 19/48 |
| [50] | Field of Search | 74/5.41, 5.47, 5.8 |

[56] References Cited

UNITED STATES PATENTS

| 2,577,912 | 12/1951 | Perkins et al. | 74/5.47 X |
| 2,571,727 | 10/1961 | Konet | 74/5.41 UX |
| 2,868,024 | 1/1959 | Meyer | 74/5.41 UX |
| 3,203,261 | 8/1965 | Moore et al. | 74/5.47 |

FOREIGN PATENTS

| 921,740 | 3/1963 | Great Britain | 74/5.47 |
| 942,060 | 11/1963 | Great Britain | 74/5.47 |

*Primary Examiner*—Manuel A. Antonakas
*Attorneys*—Anthony F. Cuoco and Plante, Hartz, Smith and Thompson

ABSTRACT: A pulse torquing erection system for a vertical gyro for improving gyro erection switch life by limiting the current through the erection switch and for improving flight conditions by more effective utilization of erection rates.

PATENTED SEP 14 1971 3,604,276
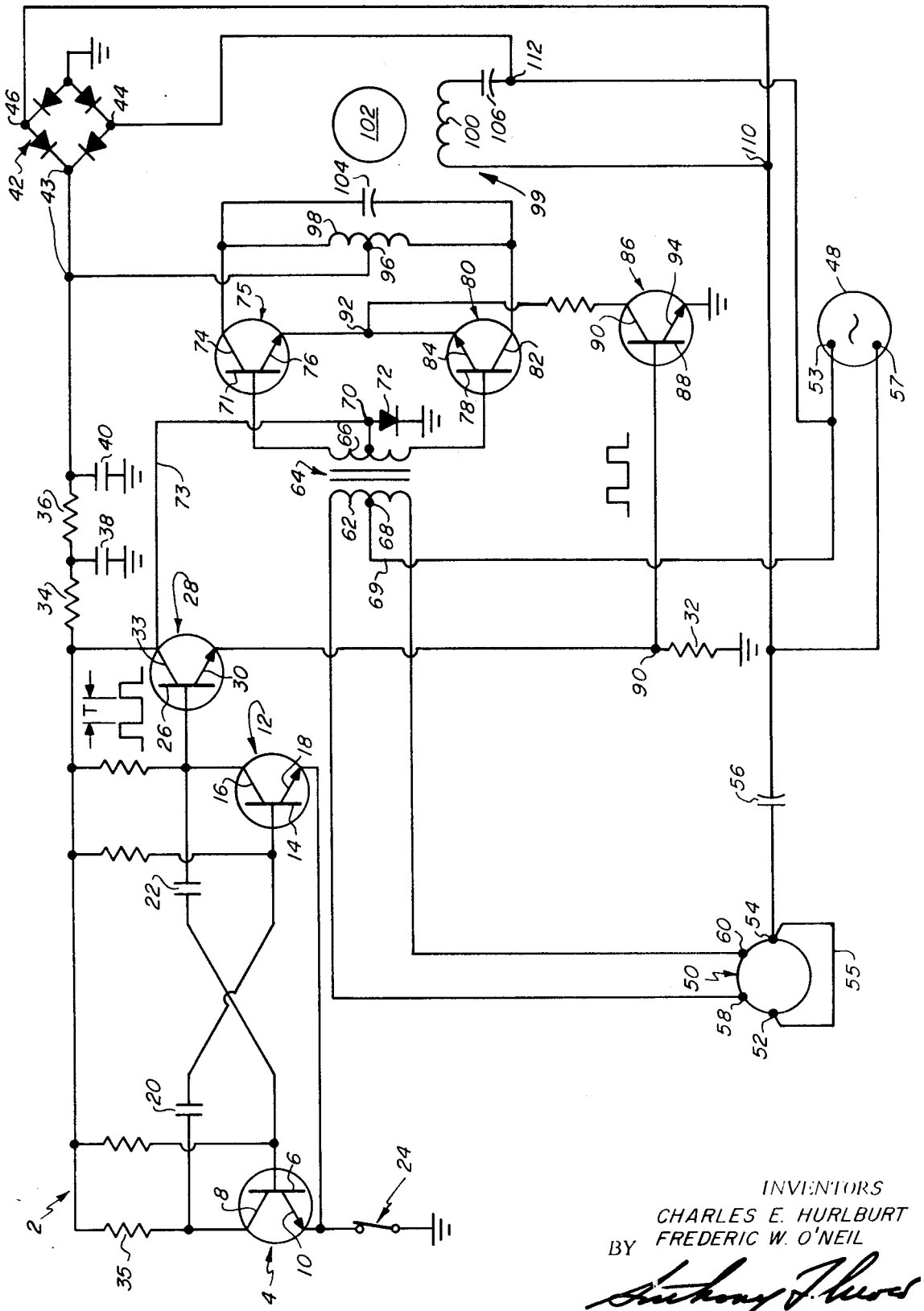
INVENTORS
CHARLES E. HURLBURT
FREDERIC W. O'NEIL
BY
*Anthony J. Hurd*
ATTORNEY

PULSE TORQUER FOR VERTICAL GYRO

BACKGROUND OF THE INVENTION

1. Field of the invention

This invention relates to erection systems for vertical gyros and, more particularly to a pulse torquing erection system for improving erection switch life and for improving flight conditions.

2. Description of the Prior Art

Vertical gyros suffer from two common deficiencies; i.e., life of erection switches and random wing down conditions in flight. Erection switch life is in good part a function of the current through the switch. Random wing down conditions, on the other hand, are attributable to the combined effect of marginal available torque caused by adverse accumulation of low limit parameters and randomly increased friction caused by marginal bearings, sliprings etc. When, at unpredictable times, the available torque does not exceed all friction parameters by a margin sufficient to overcome earth rate and gyro drift, the erection system temporarily loses control with resultant wing down conditions. Increasing erection rates solves this problem but results in undesirable dynamic errors under flight conditions while maintaining minimum erection rates on the vertical gyro.

Summary of the Invention

This invention contemplates a pulse torquing erection system which limits the current through the erection switch to only that required to control an amplifier. The amplifier output is a voltage sufficient to torque the gyro at a rate greater than normal erection rate, and is applied in short pulses whose accumulative affect is that of normal erection rate.

Therefore, one object of this invention is to provide a gyro erection system for improving erection switch life and for eliminating the effects of random wing down conditions in flight.

Another object of this invention is to provide a pulse torquing erection system for improving erection switch life by limiting the current through the switch and for improving flight conditions by eliminating the effects of random wing down conditions in flight.

Another object of this invention is to provide an amplifier controlled by the erection switch for providing output pulses for torquing the gyro at a rate greater than normal erection rate, with the accumulative affect of said pulses being that of normal erection rate.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The single FIGURE in the drawing is an electrical schematic diagram of a pulse torquing erection system in accordance with the invention.

DESCRIPTION OF THE INVENTION

The FIGURE shows an oscillator which may be, for purposes of illustration, an astable multivibrator designated generally by the numeral 2 and having a transistor 4 with base collector and emitter elements 6, 8 and 10, respectively, and another transistor 12 having base collector and emitter elements 14, 16 and 18, respectively. Collector element 8 of transistor 4 is connected through a capacitor 20 to base element 14 of transistor 12 and collector element 16 of transistor 12 is connected through a capacitor 22 to base element 6 of transistor 4. Emitter elements 10 and 18 of transistors 4 and 12, respectively, are connected to ground through a normally closed switch 24, and which switch 24 is a "fast erection" switch as will be hereinafter explained.

Collector element 16 of transistor 12 is connected to a base element 26 of a transistor 28, and which transistor 28 has an emitter element 30 connected to ground through a resistor 32 and a collector element 33 connected through a resistor 34 to a grounded capacitor 38 and connected through a resistor 35 to collector element 8 of transistor 4. Capacitor 38 is coupled through a resistor 36 to a grounded capacitor 40.

A gyro erection switch 50, which may be an electrolytic switch commonly known and hereinafter referred to as a bubble switch, has a pair of terminals 52 and 54 connected to each other through a conductor 55, with terminal 54 connected through a capacitor 56 to an output terminal 51 of a suitable source of alternating current 48. Switch 50 is a gravity sensing switch such as described, for example, in U.S. Pat. No. 2,986,946 to Sulmer and controls a torquer 99 through an amplifier causing gyro erection. Switch 50 has another pair of terminals 58 and 60 connected to opposite legs of a winding 62 of a transformer 64. Transformer 64 has a winding 66 inductively coupled to winding 62, and which winding 62 has a center tap terminal 68 connected through a conductor 69 to another output terminal 53 of alternating current source 48.

Winding 66 of transformer 64 has a center tap terminal 70 connected to a diode 72 and which diode 72 is connected through a conductor 73 to collector element 33 of transistor 28. Winding 66 has one leg connected to a base element 71 of a transistor 75 and the other leg connected to a base element 78 of a transistor 80. Transistor 75 has an emitter element 76 connected to an emitter element 84 of transistor 80, and which emitter elements 76 and 84 are connected at a point 92 to a collector element 90 of a switching transistor 86. Transistor 86 has a grounded emitter element 94 and a base element 88 connected at a point 90 intermediate resistor 32 and emitter element 30 of transistor 28.

Gyro drive torquer 99 includes a winding 98 having leg connected to collector element 74 of transistor 75 and the other leg connected to collector element 82 of transistor 80. Winding 98 has a center tap terminal 96 connected at a point 43 to a rectifier 42, with a capacitor 104 connected across torquer winding 98. Torquer 99 has another winding 100 and a rotor element 102 in cooperative relation with windings 98 and 100. Winding 100 has one leg connected to output terminal 51 of alternating current source 48 and the other leg connected through a capacitor 106 to output terminal 53 of alternating current source 48. Winding 100 is connected at a point 110 to a point 46 on rectifier 42 and is connected at a point 112 to a point 44 on rectifier 42.

OPERATION

Switch 24, as heretofore noted, is a "fast erection" switch and is normally opened by the pilot to engage the gyro in the "fast erection" mode. In the present invention, when switch 24 is opened, multivibrator 2 driven by rectifier 42 is activated whereby transistors 4 and 12 are alternately rendered conductive and nonconductive as is well known in the art to provide asymmetrical pulses at collector 16 of transistor 12, with the interval between said pulses being designated a T in the FIGURE. Transistor 28, connected to collector 16, acts as a buffer to prevent loading of multivibrator 2 by switching transistor 86, and which transistor 86 is rendered conductive by the pulses from multivibrator 2 applied through transistor 28 for driving torquer 99 through transformer 64 as will now be seen. Transformer 64, biased by diode 72, provides a low level AC from alternating current source 48 for operating bubble switch 50. Transistor 75 and 80 are arranged in push-pull amplifier configuration so as to be affected by the pulse output from transistor 86 for driving torquer 99.

The current applied to torquer 99 is applied in pulses in accordance with the pulse output from multivibrator 2 applied through switching transistor 86 to the amplifier including transistors 75 and 80, with the current through switch 50 being limited to only that required to control the amplifier.

Thus, it will now be seen that the time T between pulses from multivibrator 2 may be adjusted in accordance with the characteristics of the system so that the accumulative effect of said pulses is that of normal erection. In other words, the pulses applied will result in higher erection rates than normally required, but for short periods of time and the accumulative effect of the applied pulses is that of normal erection. By way of example only, if a torque sufficient to drive the gyro at 12° per minute is applied one-sixth of the time, the gyro will erect at 2° per minute; i.e., 1000 increments of 0.002° in 10 millisecond pulses, each followed by 50 milliseconds of no torque. The benefit realized from such a system is that friction or other "hang-up" which would stop a constant torque of 2° per minute will not stop any of the applied pulses, each equivalent to an erection rate of 12° per minute.

By employing a system of this kind, current through switch 50 is effectively limited and results in longer switch life. On the other hand, since the torquing pulses provide erection rates faster than normal, albeit for short intervals of time, the disadvantages of marginal torque are avoided with the accumulative effect of said pulses being that of normal erection rate.

Although only one embodiment of the invention has been illustrated and described, various changes in the form and relative arrangements of the parts, which will now appear obvious to those skilled in the art may be made without departing from the scope of the invention. Reference is, therefore, to be had to the appended claims for definition of the limits of the invention.

What we claim is:

1. An erection system for a gyroscope, comprising:
    a voltage source which provides a voltage at a relatively low level;
    a transformer connected to the voltage source;
    a gravity sensing switch connected to the voltage source and connected to the transformer, and responsive to the low level voltage for switching said transformer to an operative condition;
    an oscillator which provides pulses at a predetermined frequency;
    an amplifier connected to the transformer and connected to the oscillator and operated by the pulses from the oscillator for providing controlling pulses;
    a torquer connected to the amplifier and connected to the voltage source and responsive to the controlling pulses and to the low level voltage for erecting the gyro;
    switching means connected to the amplifier; and
    buffer means connected to the transformer, and connecting the switching means to the oscillator for preventing loading of said oscillator.

2. An erection system as described by claim 1 wherein the transformer includes;
    a winding having a center-tap terminal connected to the voltage source; and
    another winding having a center-tap terminal connected to the buffer means.

3. An erection system as described by claim 2, including:
    means connected to the center tap terminal of the other transformer winding and connected to the buffer means for biasing said buffer means.

4. An erection system as described by claim 1, wherein the torquer includes:
    a winding connected to the amplifier;
    another winding connected to the voltage source; and
    a rotor element in cooperative relation with said windings.

5. An erection system as described by claim 1, wherein:
    the switching means includes a transistor having a collector element connected to the amplifier, a base element connected to the buffer means and a grounded emitter element; and
    the buffer means includes a transistor having base and collector elements connected to the oscillator and an emitter element connected to the base element of the switching means transistor.

6. A erection system as described by claim 2, wherein the amplifier means includes:
    a first transistor having a base element connected to one leg of the other transformer winding, a collector element connected to the torquer and an emitter element;
    a second transistor having a base element connected to the other leg of the other transformer winding, a collector element connected to the torquer and an emitter element connected to the emitter element of the first transistor; and
    the switching means being connected intermediate the emitter elements of the first and second transistors.

7. An erection system as described by claim 4, including:
    a capacitor connected across the one torquer winding.

8. An erection system as described by claim 1, including:
    normally closed switching means for connecting said oscillator to ground, and said oscillator being effective upon opening of said switching means for providing the pulses at the predetermined frequency.

9. An erection system as described by claim 1, including:
    a power supply having first and second terminals connected to the voltage source, a third terminal connected to ground and a fourth terminal connected to the oscillator and to the torquer.